May 21, 1929. E. RYDER 1,713,781
LIQUID LEVEL INDICATOR
Filed Jan. 24, 1924
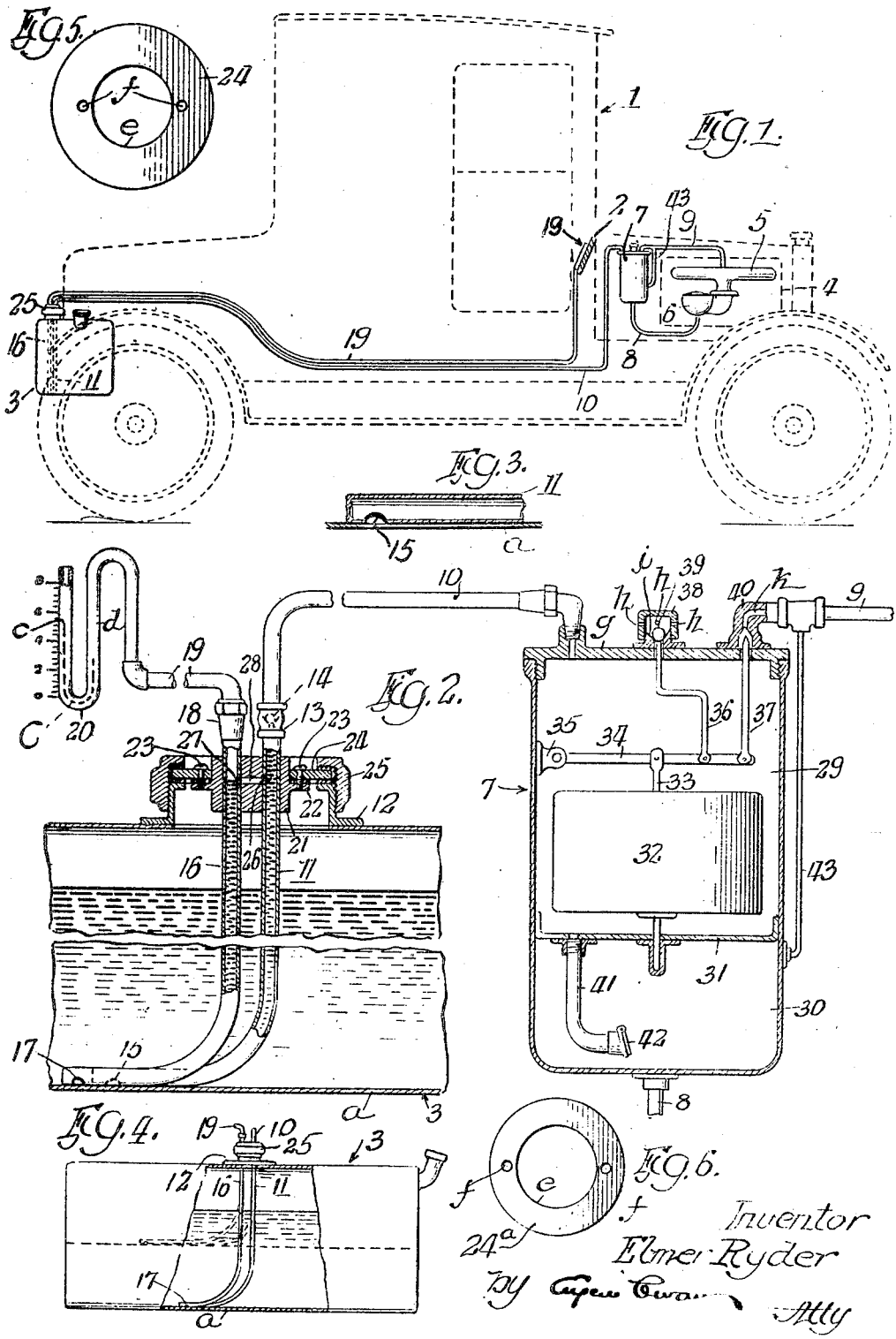

Patented May 21, 1929.

1,713,781

UNITED STATES PATENT OFFICE.

ELMER RYDER, OF BERWYN, ILLINOIS.

LIQUID-LEVEL INDICATOR.

Application filed January 24, 1924. Serial No. 688,256.

This invention relates to liquid level indicators particularly adapted for use on automobiles and other motor vehicles for indicating at all times on the instrument board or other place in view of the driver, the amount of fuel contained in the supply tank on the car.

One object of my invention is to actuate the indicating gage by the same suction or partial vacuum used to draw fuel from the supply tank into the vacuum tank during the operation of the engine, thereby simplifying the construction and making it practicable of application to a car.

Another object of my invention is to provide a structure permitting my device to be fitted as an accessory to any make of car employing the vacuum feed principle, regardless of variation in the depths of supply tanks as well as sizes of necks through which the devices enter the tank.

Other and further objects of my invention will appear from the following specification taken in connection with the accompanying drawings, in which—

Fig. 1 is a view showing a device of my invention installed on an automobile;

Fig. 2 is an enlarged vertical sectional view of the equipment, with some parts in elevation;

Fig. 3 is a sectional view through the lower end of the outlet conduit to be hereinafter described;

Fig. 4 indicates how the flexible conduits in the supply tank may be bent to accommodate them to tanks of various depths; and Figs. 5 and 6 are plan views of two apertured discs to be hereinafter referred to.

In Fig. 1 of the drawings, 1 indicates in dotted lines an automobile equipped with a device of my invention for indicating at all times in front of the driver, as on the instrument board 2 or other place in view of the driver, the amount of gasolene or other fuel in the supply tank 3 carried at the rear of the car. As illustrated in said figure, the engine or motor 4 at the front of the car has an intake manifold 5 connected with the carbureter 6 fed with gasolene from the supply tank 3 through a vacuum tank 7, as in prevailing automobile practice. The tank 7 feeds the carbureter 6 by a pipe 8 leading from the bottom of said tank. The upper part of the tank 7 is connected with the intake manifold 5 by a pipe 9 whereby the engine or motor 4 in operation may create a suction or partial vacuum in the tank 7 to draw gasolene or other fuel into the same from the supply tank 3 through a pipe line 10 connecting the upper end of the tank 7 with the supply tank 3, as clearly shown in Figs. 1 and 2.

The pipe line 10 includes a pipe or conduit 11 extending into the supply tank 3 through a tubular neck 12 on the top wall of the tank 3. This conduit 11 is connected with the pipe line 10 beyond the neck 12 by a coupling 13 in which is a check valve 14 arranged to open in the direction of flow toward the vacuum tank 7. The lower end of the conduit 11 is closed (Fig. 3) and extends to the bottom wall $a$ of the tank 3, where said conduit 11 has an inlet opening 15 formed in its under side, as shown in said Fig. 3.

Arranged adjacent the conduit 11 is a similar pipe or conduit 16 also extending into the tank 3 to its bottom wall $a$ through the neck 12 and closed at its lower end like the conduit 11. The conduit 16 has an inlet opening 17 in its under side like the conduit 11. Said conduit 16 extends out of the tank 3 through the neck 12, and by a coupling 18 is connected with a pipe line 19 leading to a vacuum gage 20 graduated in units of measure indicating gallons and fractions thereof, as shown in Fig. 2. This gage 20 may be of any form desired, and in Fig. 2, for illustrative purposes, I have shown the gage of the type having a U-tube containing a column of mercury $b$ rising in the outer leg $c$ of the tube to indicate by the graduations associated therewith the amount of fuel in the tank 3. The outer leg $d$ of said tube is connected with the pipe line 19. Said gage 20 is preferably located on the instrument board 2 of the vehicle, or at any other desired place to be visible from the driver's seat.

For holding the conduits 11 and 16 in the tank 3, I provide in the neck 12 an annular block-like member 21 through which both conduits extend side by side, as shown in Fig. 2. This block 21 is provided between its upper and lower ends with a surrounding flange 22 to which is connected, as by screws 23, a washer or disc like member 24, the latter extending to and held against the upper edge of the neck 12 by a gland nut 25 screwed on the outside of said neck. The centrally arranged opening $e$ in the disc 24 is of a diameter to receive the upper portion of the block 21. The outer diameter of the disc 24 is like that of the neck 12 so that the disc will extend across the neck and rest on its upper edge for supporting the block 21 in the neck 12. As shown in Figs. 2 and 5, the disc 24 has two diametrically arranged apertures or holes $f, f$ adjacent its opening $e$ for the screws or other fasteners 23. Gaskets may be placed between the disc and the flange and neck to make tight joints, as shown in Fig. 2.

The conduits 11 and 16 have aligned ports or apertures 26, 27, respectively, one in each conduit. These holes 26, 27 are arranged opposite each other and both open into a common passage 28 provided between them in the block 21, as shown in Fig. 2. By the holes 26, 27 and passage 28, conduits 11 and 16 are in direct communication at a predetermined distance or level above the level of the liquid in the tank 3 with the result that the same suction or vacuum placed on the pipe line 10 through the tank 7 exists in both conduits to substantially the same extent, thus raising or lifting in each conduit from the tank 3 a column of the tank liquid. The amount of suction or vacuum required to lift these liquid columns above tank level varies as tank level changes, with the result that the gage 20, responding to the variations, indicates in gallons and fractions thereof the quantity of fuel in said tank 3. As tank level decreases, by fuel consumption, greater suction or vacuum is required to lift this liquid column than when the tank is full, with the result that when the tank is full the mercury $b$ stands high in the leg $c$ of the tube, and low when the tank level is low.

As shown in Fig. 2, the vacuum tank 7 is divided into upper and lower chambers or compartments 29, 30 by a horiozntal partition wall 31. In the upper chamber 29 is a float 32 having a rod 33 pivoted at its upper end to an arm 34 above said float. Said arm 34 is pivoted at one end to a bracket 35 fixed in the tank, and at its other end is pivoted to the lower ends of two rods 36, 37 extending above said arm. The rod 36 extends through the top wall $g$ of the tank 7 into a casing 38 provided with air holes $h, h$ opening to the atmosphere. The casing 38 has a valve seat $i$ for a ball valve 39 on the upper end of said rod 36.

The other rod 37 extends through the top wall $g$ of the tank 7 into a fitting 40 and has its upper end pointed like a needle valve end to open and close the passage $k$ in said fitting. The pipe 9 is connected with said fitting 40. A pipe 41 in the lower chamber 30 opens said chamber to the upper chamber 29 through the partition wall 31, as shown in Fig. 2. At the outlet end of the pipe 41 is a flap check valve 42, as usual in structures of the kind just described. There is a balancing pipe 43 between the upper part of the chamber 30 and the passage in the fitting 40.

By the structure above described, the upper chamber 29 periodically empties into the lower chamber 30 and from which fuel is fed into the carbureter 6 through the pipe 8. As the upper chamber 29 empties, the float 32 descends, carrying the rod 37 down and opening the pipe 9 to the tank 7. At the same time, the rod 36 lowers and its ball valve 39 closes the tank 7 to the atmosphere through the casing 38. This places the upper chamber 29 under suction and said chamber is filled with fuel from the tank 3 through the conduits 10 and 11. During this flow, the liquid column in the conduit 16 is maintained at the level of the aperture 27, any fuel tending to rise above that level passing into the conduit 11 through the passage 28 so that the column in the conduit 16 is maintained at a predetermined level above the level in the tank 3 regardless of changes of tank level. When the upper chamber 29 is filled, the float 32 having been raised closes the tank 7 to suction, and opens it to atmosphere. By the check valve 14, the tank 3 is prevented from venting through the conduit 10 to drop the liquid columns in conduits 11 and 16, with the result that the gage 20 remains at the position brought by the suction to indicate the amount of fuel in the tank 3.

Devices of my invention may be installed on cars as built and thus be furnished as standard equipment. They may also be applied to cars already in service as an accessory. In this connection, provision must be made for supply tanks of various depths as found on cars of different makes. To provide for this condition, I make the conduits 11 and 16 flexible, as of copper, so that said conduits may be readily and easily bent. As shown in full lines in Figs. 2 and 4, the conduits 11 and 16 have their lower ends bent to lie flatwise on and along the bottom wall $a$ of the tank 3. When the tank is of less depth than that shown, these conduits may be bent up to lie against the bottom wall of the shallower tank, as indicated by dotted lines in Fig. 4.

Supply tanks as heretofore built are usually fitted with gasolene gages readable only at the tanks, and then only when the glass covers are wiped free and clean of dust and dirt. These gages are fitted in necks, such as 12, with which the tanks are provided. On different makes of cars, these necks vary in diameter according to the sizes of the tanks. The conduits 11 and 16 and block 21 are made to fit the average size of neck. In order that a block of one diameter may be used for necks of different diameters, I provide a set of the discs 24, these differing only in that they have different outside diameters to fit the various sizes of necks encountered on various makes of cars. The holes e of the discs have the same diameter. In Figs. 2 and 5, the discs 24 have the same outside diameter. In Fig. 6, the disc 24ª has a smaller outside diameter, but its hols e is the same in diameter as the like hole in the disc 24 of Fig. 2. Such additional sizes of discs may be supplied as required for the purposes intended, all of them being interchangeable with the one size of block 21.

The device operating by vacuum will function accurately without being affected by changes in temperature or disturbance of tank level by the wash while the car is in motion.

Another important feature of my invention is the provision of the pipe lines, including the conduits 11 and 16. By this means, the gage 20 is not only operated to indicate at all times the amount of liquid in the supply tank 3, but supply to the vacuum tank 7 is effected through the same device, thus simplifying the structure, its cost, and manner of installation. Other and further advantages of my invention will be apparent to those skilled in the art to which it relates.

The lower ends of the conduits 11 and 16 are closed to minimize disturbance of the liquid columns therein under tank wash.

The structure shown and described herein may be variously changed and modified without departing from the spirit and scope of my invention.

I claim as my invention:

1. The combination with a tank containing a liquid, of two conduits extending down into the liquid in said tank and having inlet openings at the full depth of the liquid to be measured, means providing a communicating passage between said conduits at a point above the level of said liquid, means for placing suction on one conduit for drawing liquid therethrough from the tank and raising a column of liquid up in the other conduit to said passage, a gage connected with the last named conduit and actuated by the suction exerted therein through said passage for indicating the amount of liquid in the tank, and a check valve above said passage and located in the conduit through which liquid passes to prevent the liquid columns dropping in both conduits when not under suction.

2. In combination with a tank containing a liquid and having an upstanding tubular neck on its top wall, of two conduits extending down into the liquid in said tank through said neck and having inlet openings at the full depth of the liquid to be measured, a block at said neck and having openings through which the conduits extend, a disc connected to said block and clamped to said neck for supporting the block and conduits therefrom, said block having a passage opening into both conduits, means for placing suction on one conduit for drawing liquid therethrough from said tank and for raising a column of liquid up in the other conduit to said passage, and a gage connected with the other conduit and actuated by the suction exerted therein through said passage for indicating the amount of liquid in the tank.

3. The combination with a liquid containing tank having a tubular neck on its top wall, of two conduits extending down into said tank through said neck and having inlet openings at their lower ends, a block to fit in said neck and having openings through which the conduits extend, said block having a passage opening into both conduits, and disc like members of different outside diameters so as to fit necks of different sizes, the discs adapted to be interchangeably connected with said block so that the latter and the conduits passing therethrough may be applied to tanks having necks of different sizes.

4. The combination with a tank containing a liquid, of two conduits extending down into the liquid in said tank and having inlet openings at the full depth of the liquid to be measured, means for providing a communicating passage between said conduits at a point above the level of said liquid, means for placing suction on one conduit for drawing liquid therethrough from the tank and raising a column of liquid up in the other conduit to said passage, a gage connected with the last named conduit and actuated by the suction exerted therein through said passage for indicating the amount of liquid in the tank, and said conduit through which liquid is withdrawn including means for preventing back flow of air therethrough.

In testimony that I claim the foregoing as my invention, I affix my signature this 21st day of January, 1924.

ELMER RYDER.